United States Patent [19]
Murata et al.

[11] Patent Number: 5,329,526
[45] Date of Patent: Jul. 12, 1994

[54] TRUNK LINE IDENTIFICATION SYSTEM

[75] Inventors: Shigeru Murata; Kaoru Nagakura, both of Kawasaki, Japan

[73] Assignee: Fujitsu Limited, Kawasaki, Japan

[21] Appl. No.: 850,134

[22] Filed: Mar. 12, 1992

[30] Foreign Application Priority Data

Mar. 18, 1991 [JP] Japan .................................. 3-052810

[51] Int. Cl.$^5$ ............................................ H04Q 11/04
[52] U.S. Cl. ........................................ 370/60; 379/246
[58] Field of Search .................... 370/53.16, 58.1, 58.2, 370/58.3, 54, 55, 60, 68.1, 60.1, 68, 110.1; 379/245, 246, 221; 340/825.03, 826, 827

[56] References Cited

U.S. PATENT DOCUMENTS

| | | | |
|---|---|---|---|
| 4,039,758 | 8/1977 | Shiyasu et al. | 379/245 |
| 4,090,034 | 5/1978 | Moylan | 379/246 |
| 4,277,649 | 7/1981 | Sheinbein | 379/246 |
| 4,759,049 | 7/1988 | Mangini | 379/22 |
| 4,885,780 | 12/1989 | Gopal et al. | 379/221 |

FOREIGN PATENT DOCUMENTS 63-15556  1/1988  Japan .
2066624  7/1981  United Kingdom .

OTHER PUBLICATIONS

Patent Abstracts of Japan, vol. 10, No. 133 (E-404) May 17, 1986 & JP-A-60 263 555 (Nippon Denshin Denwa Kosha) Dec. 27, 1985, Abstract.
Patent Abstracts of Japan, vol. 12, No. 440 (E-684) Nov. 18, 1988 & JP-A-63 172 555 (NEC) Jul. 16, 1988, Abstract.

Primary Examiner—Douglas W. Olms
Assistant Examiner—Ajit Patel
Attorney, Agent, or Firm—Staas & Halsey

[57] ABSTRACT

A trunk line identification system includes a line switch part connected to each of a plurality of channels of a transmission line, channel processing parts for processing signals received from and transmitted to the transmission line via the line switch part, where the channel processing parts are provided with respect to each of the channels and include first and second parts, and a switching system for switching signals. When relaying a signal received by a first channel processing part from the transmission line via the line switch part to the transmission line via the switching system and a second channel processing part, the first part of the second channel processing part transmits an identification signal to the first channel processing part via the switching system, and the second part of the first channel processing part judges whether or not a line being used is a trunk line based on whether or not the identification signal is detected.

16 Claims, 9 Drawing Sheets

TRUNK LINE IDENTIFICATION SYSTEM

CROSS-REFERENCE TO RELATED APPLICATION

The present application is related to PCT Application No. PCT/JP91/1045 filed Aug. 6, 1991 which is based on Japanese Patent Application No. 2-207836 filed Aug. 8, 1990 and designates the United States.

BACKGROUND OF THE INVENTION

The present invention generally relates to trunk line identification systems, and more particularly to a trunk line identification system which is applied to a communication from a first station to a second station via a third station.

FIG. 1 generally shows an example of a conventional communication system. A station "A" is coupled to a station "B" via a transmission line 3, and the station "B" is coupled to a station "C" via a transmission line 4 Each of the stations "A" "B" and "C" have a switching system 1 and a transmitting apparatus 2. For example, each transmitting apparatus 2 compresses a pulse code modulation (PCM) signal of 64 kbps into 32 kbps by an adaptive differential pulse code modulation (ADPCM) coding scheme and transmits the compressed signal on the transmission line 3 or 4.

Among the signals transmitted from the station "A" to the station "B" there are signals which are to be dropped to a subscriber 5 within the station "B" and signals which are to be transmitted to the station "C" via the station "B".

According to the conventional communication system, the transmitting apparatus 2 multiplexes signals amounting to a plurality of channels (for example, 24 channels in the case of PCM 24 system) and simply transmits the multiplexed signal on the line. Hence, there is no function of judging whether the signal received from the station "A" via the transmission line 3 is to be dropped at the station "B" or relayed to the station "C" via the transmission line 4. For this reason, the transmitting apparatus 2 of the station "B" must once decode the compressed signal back into the original PCM signal, and the switching system 1 of the station "B" judges whether the PCM signal is to be dropped at the station "B" or relayed to the station "C" via the transmission line 4. If the PCM signal is to be dropped at the station "B", the PCM signal is dropped to the subscriber 5. But if the PCM signal is to be relayed to the station "C" the PCM signal is first returned to the transmitting apparatus 2 of the station "B" so as to be compressed again, and the compressed signal is then transmitted to the station "C" via the transmission line 4. As a result, the signal from the station "A" is relayed by the station "B" and transmitted to the station "C".

As described above, the switching system 1 of the relay station "B" must also receive the signal which is unrelated to the station "B" that is the signal which is simply to be relayed to the station "C". Hence, the number of lines to the transmission line must be reserved by taking into account such traffic of signals.

In the case of high-speed digital lines and integrated services digital networks (ISDNs), the transmission is generally made at 32 kbps or 16 kbps per voice grade line using the voice compression technique. In these cases, a voice compression circuit is provided in the transmitting apparatus 2 in a connection channel to the switching system 1, so that the voice compression is carried out prior to transmission to the transmission line. However, the signal which is simply to be relayed by the relay station "B" is also passed through such a voice compression circuit when connecting to the switching system 1 of the relay station "B" although the signal which is to be relayed by the relay station "B" originally does not need to be subjected to the voice compression. On the other hand, in the case where the voice signal has a relatively low bit rate which is less than 16 kbps, the voice signal is subjected to a predetermined voice signal processing other than the voice compression.

In other words, because the switching system 1 processes each voice grade line at 64 kbps, the necessary switching cannot be made if the signals are in the form of the compressed voice signals. Accordingly, even if the compressed voice signals are simply to be relayed at the relay station "B" the compressed voice signals must first be expanded back to the voice signals in order to perform the necessary switching. As a result, there are problems in that an unnecessary voice signal processing circuit must be provided, a signal delay is increased by the provision of the voice signal processing circuit, and the system design becomes complex.

SUMMARY OF THE INVENTION

Accordingly, it is a general object of the present invention to provide a novel and useful trunk line identification system in which the problems described above are eliminated.

Another and more specific object of the present invention is to provide a trunk line identification system comprising a line switch part connected to each of a plurality of channels of a transmission line, channel processing parts, coupled to the line switch part, for processing signals received from and transmitted to the transmission line via the line switch part, where the channel processing parts are provided with respect to each of the channels and include first and second means, and a switching system, connected to the channel processing parts, for switching signals. When relaying a signal received by a first channel processing part from the transmission line via the line switch part to the transmission line via the switching system and a second channel processing part, the first means of the second channel processing part transmits an identification signal to the first channel processing part via the switching system, and the second means of the first channel processing part judges whether or not a line being used is a trunk line based on whether or not the identification signal is detected. According to the trunk line identification system of the present invention, it is possible to efficiently recognize whether a signal is to drop at the station or to simply be relayed to another station.

Still another object of the present invention is to provide the trunk line identification system of the type described above wherein each channel processing part includes third means for subjecting a signal received from and transmitted to the transmission line via the line switch part to a predetermined signal processing, and there is further provided control means, coupled to each of the channel processing parts, for controlling the third means of each of the channel processing parts based on outputs of the second means of each of the channel processing parts, so that the control means bypasses the predetermined signal processing in the third means of the first and second channel processing parts when the second means of the first channel processing part detects the identification signal from the first means of the second channel processing part. According to the trunk line identification system of the present invention, it is possible to prevent unnecessary signal processing when the received signal is simply to be relayed and not dropped.

Other objects and further features of the present invention will be apparent from the following detailed description when read in conjunction with the accompanying drawings.

DESCRIPTION OF THE PREFERRED EMBODIMENTS

Figure 1:
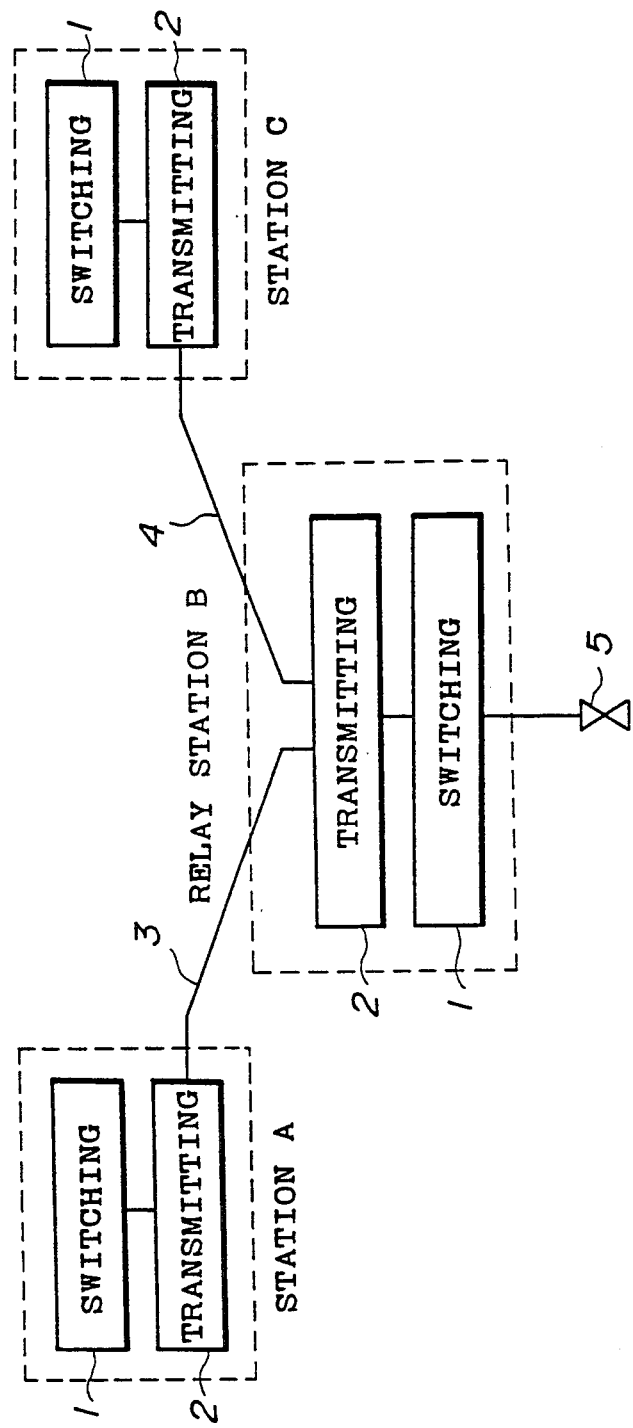
FIG. 1 is a system block diagram generally showing an example of a conventional communication system.
Figure 2:
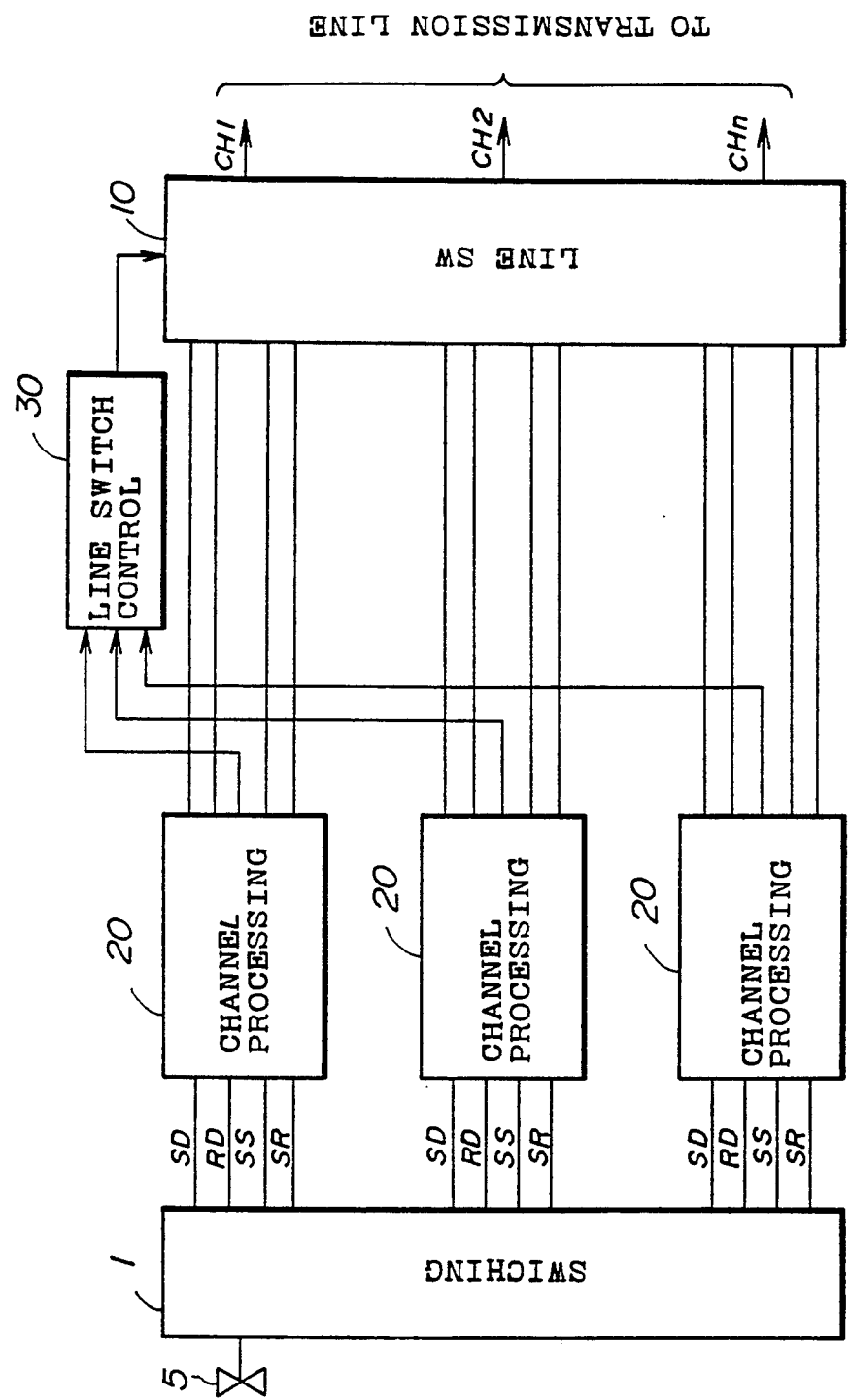
FIG. 2 is a system block diagram for explaining the operating principle of a first embodiment of a trunk line identification system according to the present invention.
Figure 3:
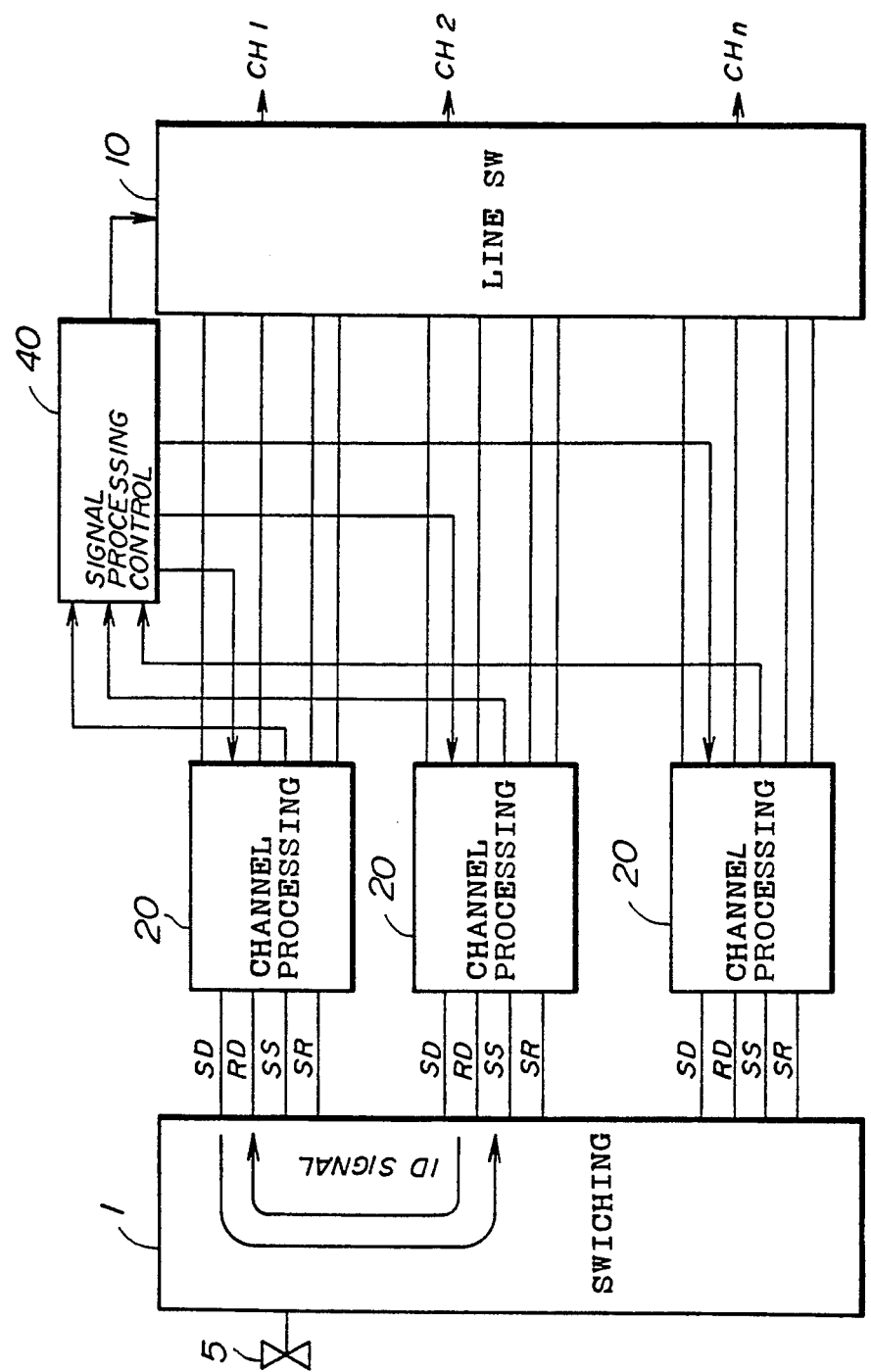
FIG. 3 is a system block diagram for explaining the operating principle of a second embodiment of the trunk line identification system according to the present invention.

First, a description will be given of the operating principles of first and second embodiments of the trunk line identification system according to the present invention, by referring to FIGS. 2 and 3. FIG. 2 shows a block system for explaining the operating principle of the first embodiment, and FIG. 3 shows a block system for explaining the operating principle of the second embodiment. In FIGS. 2 and 3, those parts which are the same as those corresponding parts in FIG. 1 are designated by the same reference numerals.

In FIG. 2, a plurality of channel processing parts 20 are coupled between the switching system 1 and a line switch part 10. The line switch part 10 and the channel processing parts 20 are included within the transmitting apparatus 2. A line switch control part 30 is coupled between the channel processing parts 20 and the line switch part 10. This line switch control part 30 controls the switching of the line switch part 10 in response to control signals output from the channel processing parts 20. The subscriber 5 is coupled to the switching system 1.

A transmission data signal SD, a reception data signal RD, a signal transmission signal SS and a signal reception signal SR are transmitted between the switching system 1 and the transmitting apparatus 2 via signal lines which are independent from the data signal lines.

When connecting to the communication line, an identification signal is transmitted from the channel processing part 20 of the first station in a direction opposite to the connecting direction of the call. If this communication line is to drop to the first station to which the channel processing part 20 belongs, the identification signal will not reach the channel processing part 20 of the second station at the other end. In addition, if this communication line is a trunk line, the switching system 1 of the first station internally relays this line, and the identification signal will reach the channel processing part 20 of the second station at the other end. Accordingly, it is possible to efficiently recognize at the transmitting apparatus 2 of the first station whether the signal is to drop to the first station or the signal is to be relayed via the first station. If the communication line is used simply for relaying the signal, the line switch control part 30 controls the line switch part 10 in the first station to loop back the line without passing the signal via the switching system 1 of the first station.

In FIG. 3, those parts which are the same as those corresponding parts in FIG. 2 are designated by the same reference numerals, and a description thereof will be omitted. In FIG. 3, a signal processing control part 40 carries out a signal process based on output control signals of the channel processing parts 20, and supplies signals to the line switch part 10 and each of the channel processing parts 20.

When connecting to the communication line, an identification signal is transmitted from the channel processing part 20 of the first station in a direction opposite to the connecting direction of the call. If this communication line is to drop to the first station to which the channel processing part 20 belongs, the identification signal will not reach the channel processing part 20 of the second station at the other end. In addition, if this communication line is a trunk line, the switching system 1 of the first station internally relays this line, and the identification signal will reach the channel processing part 20 of the second station at the other end. Accordingly, it is possible to efficiently recognize at the transmitting apparatus 2 of the first station whether the signal is to drop to the first station or the signal is to be relayed via the first station. If the communication line is used simply for relaying the signal, it is sufficient to simply switch the line, and the signal processing control part 40 changes the signal processing system so as not to carry out a voice compression which is originally unnecessary.

Therefore, as may be understood from the operating principles of the first and second embodiments, the present invention does not require the unnecessary voice compression and there is no need to provide an additional voice processing circuit.

Figure 4:
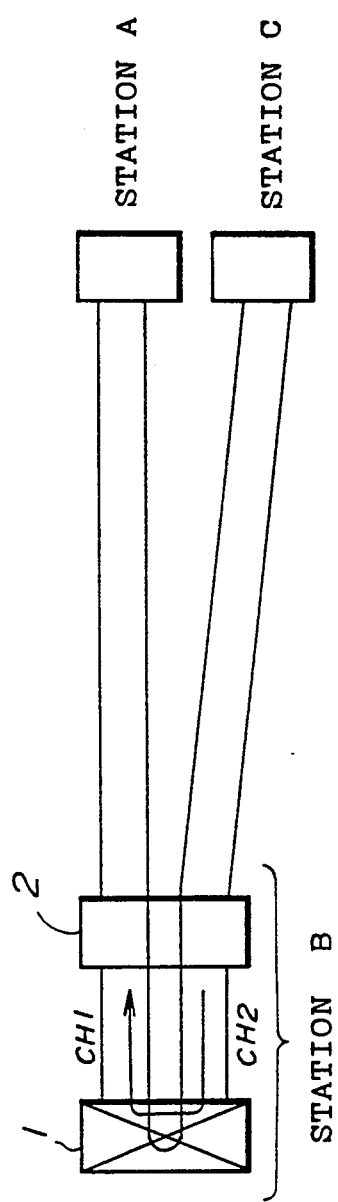
FIG. 4 is a system block diagram generally showing a communication system to which the present invention is applied.

FIG. 4 generally shows a communication system to which the present invention is applied. It is assumed for the sake of convenience that a signal is transmitted from a station "A" to a station "C" via a relay station "B". In this case, at the transmitting apparatus 2 of the relay station "B" a connection is made from a channel CH1 to a channel CH2 by a call, and the signal is transmitted in a loop indicated by a bold line. In the case of the trunk line, the signal is always looped back by the switching system 1 of the relay station "B" as shown. Accordingly, when an identification signal is transmitted from the channel CH2 to the channel CH1 as indicated by a thin line, that is, in a direction opposite to the connecting direction of the call, this identification signal is transmitted from the channel CH2 to the channel CH1 because the switching system 1 of the relay station "B" is connected as shown. But if the line is to drop to the relay station "B" the looping back connection shown does not exist, and the identification signal will not be transmitted from the channel CH2 to the channel CH1. Hence, it is possible to identify the trunk line by detecting whether or not the identification signal is received at the channel CH1.

Figure 5:
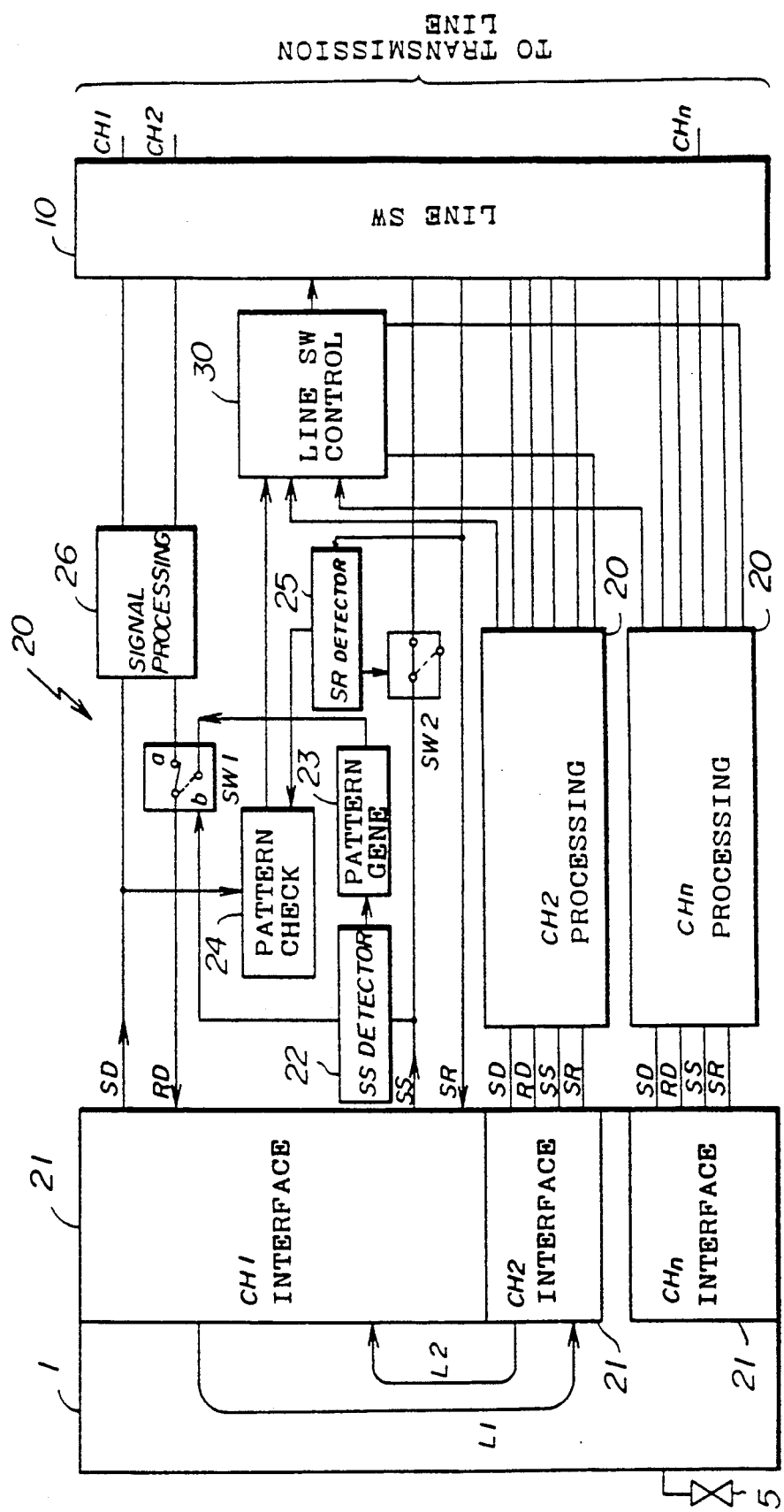
FIG. 5 is a system block diagram showing an essential part of the first embodiment.

Next, a more detailed description will be given of the first embodiment, by referring to FIG. 5. In FIG. 5, those parts which are the same as those corresponding parts in FIG. 2 are designated by the same reference numerals, and a description thereof will be omitted.

In FIG. 5, those parts other than the switching system 1 form the transmitting apparatus 2 shown in FIG. 4. A channel interface 21 connects the transmitting apparatus 2 and the switching system 1. A SS detector 22 detects a signal SS from a SS line. A pattern generator 23 is started by the SS detector 22. A pattern check part 24 checks the data pattern of the transmitting data which is received via a SD line. For example, the pattern generator 23 includes a read only memory (ROM) which generates a fixed pattern, and the pattern check part 24 includes a comparator for checking the pattern by comparison.

A SR detector 25 detects a signal SR, and an output of this SR detector 25 starts the pattern check part 24. A signal processing part 26 is connected to SD and SD lines, and a switch SW1 is inserted at an intermediate part of the RD line. A contact a of the switch SW1 is connected to the RD line, and a contact b of this switch SW1 is connected to the pattern generator 23. The switch SW1 is controlled by an output of the SS detector 22. Another switch SW2 is controlled by an output of the SR detector 25. The line switch control part 30 receives the output of the pattern check part of each of the channel processing parts 20 and controls the connection of the line switch part 10. The subscriber 5 is connected to the switching system (voice line switch) 1.

Next, a more detailed description will be given of the operation of the first embodiment, by referring to FIG. 5. It will be assumed for the sake of convenience that the line is connected from the station "A" to the station "C" via the relay station "B" as in the case shown in FIG. 4 described above. In addition, it will be assumed that the connecting direction of the call at the relay station "B" is from the channel CH1 to the channel CH2 as indicated by an arrow L1.

Figure 6:
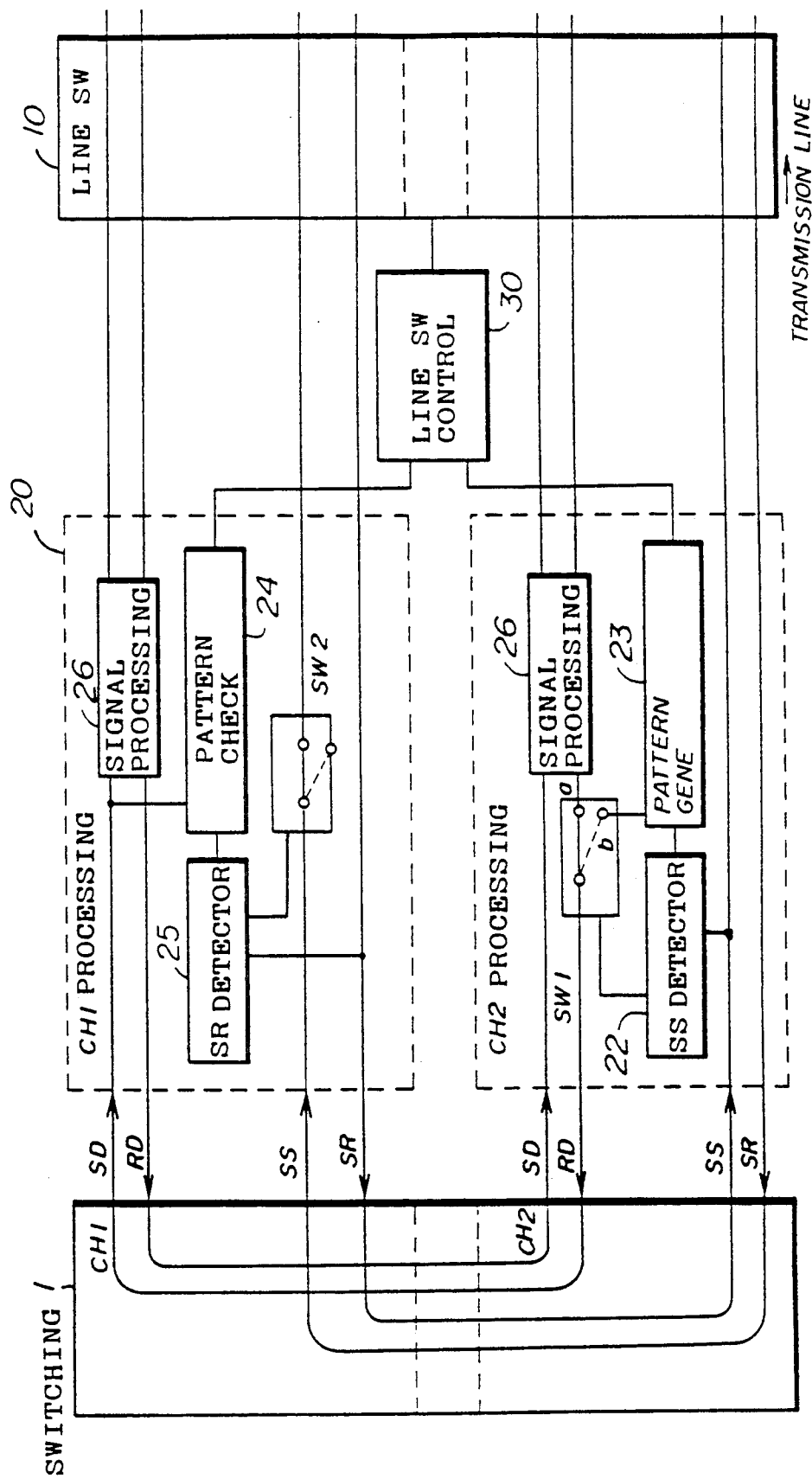
FIG. 6 shows the state of the connection at each part of the first embodiment for explaining one operation thereof.

First, the signal SR becomes ON on the side of the channel CH1. On the side of the channel CH2, the signal SS becomes ON. FIG. 6 shows the state of the connection at each part of the first embodiment. The SR line of the channel CH1 and the SS line of the channel CH2 become connected, and the signal SS of the channel CH2 becomes ON when the signal SR of the channel CH1 becomes ON. In this state, when the SS detector 22 detects the signal SS of the channel CH2, the pattern generator 23 of the CH2 processing part 20 is started and an identification signal is output therefrom. For example, the identification signal output from the pattern generator 23 indicates the channel CH2. The identification signal is supplied to the line switch control part 30.

Next, when the signal SR of the channel CH1 becomes ON, the SR detector 25 of the CH1 processing part 20 detects this signal SR and turns the switch SW2 OFF and also starts the pattern check part 24. In FIGS. 5 and 6, a dotted line indicates the connection in the OFF state of the switch SW2. On the other hand, on the side of the channel CH2, the signal SS becomes ON and the SS detector 22 detects this signal SS. Hence, the pattern generator 23 is started, and at the same time, the common contact of the switch SW1 is switched over and connected to the contact b from the contact a.

Accordingly, the identification signal which is generated from the pattern generator 23 of the CH2 processing part 20 passes through the switching system 1 in a direction opposite to the connecting direction of the call. In other words, the identification signal passes the RD line of the channel CH2 and reaches the pattern check part 24 of the CH1 processing part 20 via the SD line of the channel CH1. The pattern check part 24 of the CH1 processing part 20 recognizes the identification signal from the channel CH2. As a result, it is possible to recognize that the communication line is a trunk line. If the communication line is to drop to the relay station "B", the identification signal will not be connected within the switching system 1 as shown in FIG. 6, and the identification signal will not be transmitted to the side of the channel CH1.

Figure 7:
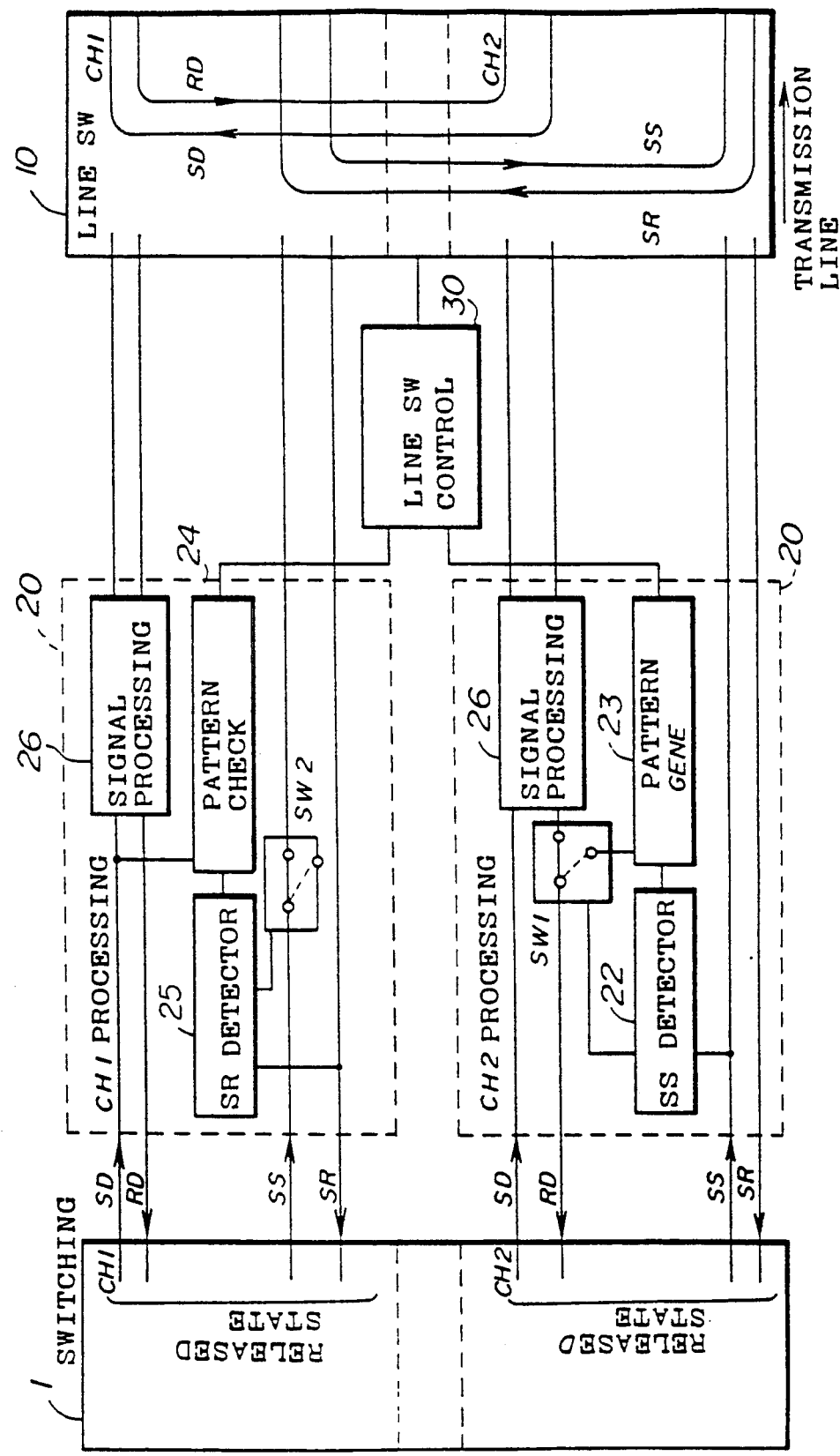
FIG. 7 shows the state of the connection at each part of the first embodiment for explaining another operation thereof.

FIG. 7 shows the state of the connection at each part of the first embodiment, for explaining another operation thereof. When it is detected in the case shown in FIG. 6 that the channel CH1 is connected to the channel CH2 by the call, the signal from the pattern check part 24 of the CH1 processing part 20 and the signal from the pattern generator 23 of the CH2 processing part 20 are supplied to the line switch control part 30. When the line switch control part 30 receives these signals, the line switch control part 30 recognizes that the communication line is a trunk line, and instructs the line switch part 10 to connect from the channel CH1 to the channel CH2. For example, the line switch part 10 is made up of a timing switch.

Accordingly, the line switch part 10 connects the channel CH1 to the channel CH2, and it is possible to realize the path setting which is carried out within the switching system 1 in the case shown in FIG. 6 on the side of the line switch part 10 in the case shown in FIG. 7. As a result, the setting of the path in the switching system 1 is released, and the load on the switching system 1 is reduced by this operation.

Figure 8:
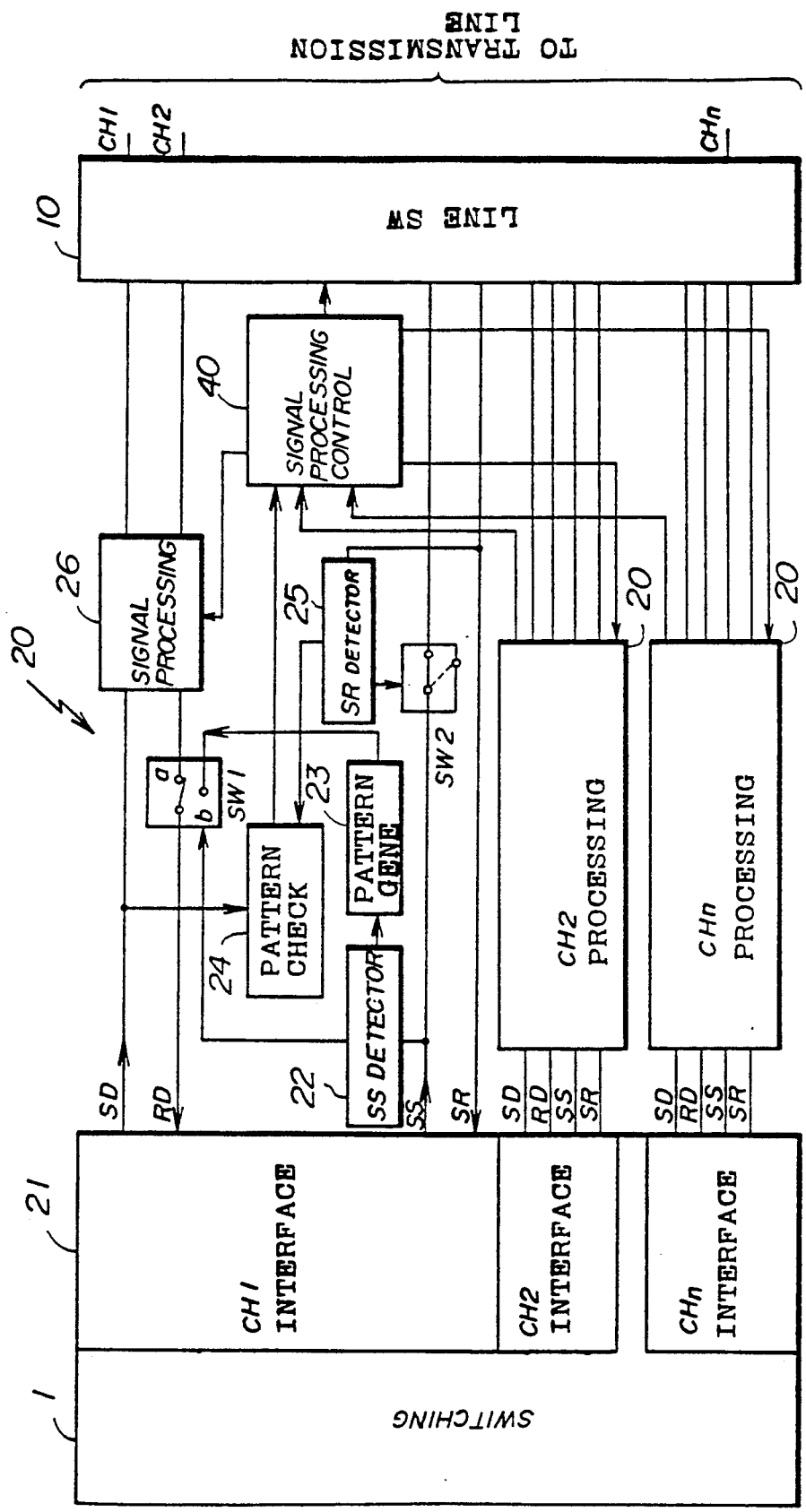
FIG. 8 is a system block diagram showing an essential part of the second embodiment.

Next, a more detailed description will be given of the second embodiment, by referring to FIG. 8. In FIG. 8, those parts which are the same as those corresponding parts in FIGS. 3 and 5 are designated by the same reference numerals, and a description thereof will be omitted.

In FIG. 8, the signal processing control part 40 receives a signal from the pattern check part 24 of each of the channel processing parts 20 and changes the signal processing. The output of the signal processing control part 40 is supplied to the line switch part 10 and the signal processing part 26 of each of the channel processing parts 20. Otherwise, the construction shown in FIG. 8 is the same as that shown in FIG. 5.

In this second embodiment, the operation is the same as that of the first embodiment described in conjunction with FIG. 5 up to the procedure which judges that the communication line is a trunk line from the channel CH1 to the channel CH2. That is, the signal SR on the side of the channel CH1 becomes ON, and the signal SS on the side of the channel CH2 becomes ON. FIG. 6 shows the state of the connection at each part of this embodiment. When the signal SR on the side of the channel CH1 becomes ON, the signal SS on the side of the channel CH2 becomes ON. When the SS detector 22 of the CH2 processing part 20 detects the signal SS of the channel CH2 which is ON, the pattern generator 23 of the CH2 processing part 20 is started by the output of the SS detector 22 of the CH2 processing part 20, and the pattern generator 23 of the CH2 processing part 20 outputs an identification signal. The identification signal output from the pattern generator 23 of the CH2 processing part 20 indicates the channel CH2, and this identification signal is supplied to the line switch control part 30.

Next, when the signal SR of the channel CH1 becomes ON, the SR detector 25 of the CH1 processing part 20 detects this signal SR and turns the switch SW2 OFF and also starts the pattern check part 24. On the other hand, on the side of the channel CH2, the signal SS becomes ON and the SS detector 22 detects this signal SS. Hence, on the side of the channel CH2, the SS detector 22 starts the pattern generator 23 and switches over the common contact of the switch SW1 to the contact b from the contact a.

Therefore, the identification signal which is generated from the pattern generator 23 on the side of the channel CH2 passes through the switching system 1 in a direction opposite to the connecting direction of the call. In other words, the identification signal passes the RD line of the channel CH2 and reaches the pattern check part 24 of the CH1 processing part 20 via the SD line of the channel CH1. The pattern check part 24 of the CH1 processing part 20 recognizes the identification signal from the channel CH2.

The pattern check part 24 of the CH1 processing part 20 supplies connection information between the channels CH1 and CH2 to the signal processing control part 40. The signal processing control part 40 instructs the change of the signal processing to the signal processing parts 26 of the channels CH1 and CH2 in response to the connection information, that is, the channel combination. As a result, the signal processing parts 26 of the CH1 and CH2 processing parts 20 change the signal processing. Accordingly, it is possible to simplify the signal processing because it is unnecessary to convert the compressed voice signal into the voice signal if the relay station "B" only needs to relay the compressed voice signal.

Figure 9:
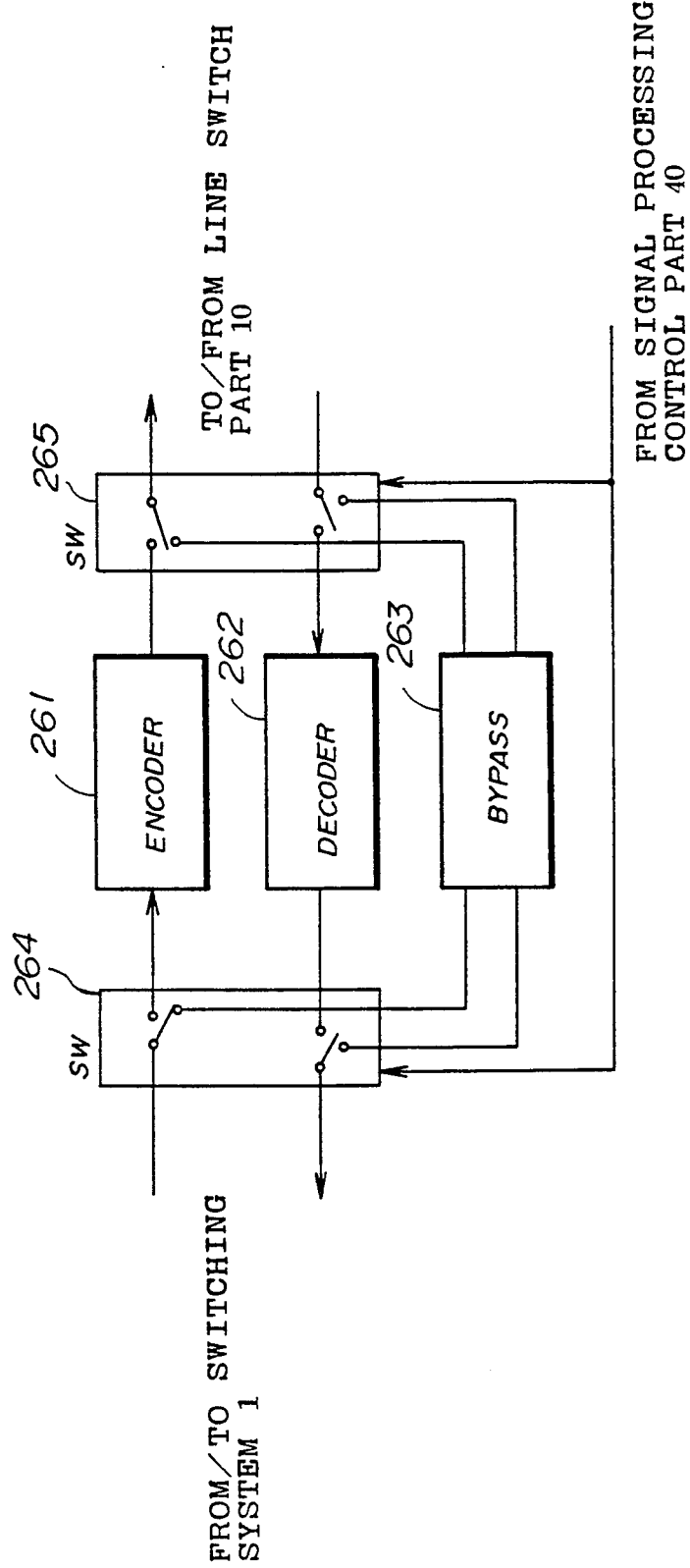
FIG. 9 is a system block diagram showing an embodiment of a signal processing part shown in FIG. 8.

FIG. 9 shows an embodiment of the signal processing part 26 shown in FIG. 8. In FIG. 9, the signal processing part 26 includes an encoder 261, a decoder 262, a bypass circuit 263, and switches 264 and 265 which are connected as shown. The switch 264 is connected to the switching system 1, and the switch 265 is connected to the line switch part 10. The switches 264 and 265 are linked and controlled by the signal from the signal processing control part 40, so that the signal to or from the transmission line passes through the encoder 261 or the decoder 262 in one mode and the bypass circuit 263 bypasses the encoder 261 and the decoder 262 in another mode. In other words, the signal processing can be changed between the two modes.

Further, the present invention is not limited to these embodiments, but various variations and modifications may be made without departing from the scope of the present invention.

What is claimed is:

1. A trunk line identification system for one of connecting channels of a first transmission line to a local subscriber of a first station and forming a trunk connection of the first transmission line with a second transmission line to connect the channels to a second station, the trunk line identification system comprising:

a line switch part connected to each of a plurality of channels of a first transmission line;

channel processing parts, coupled to said line switch part, for processing signals received from and transmitted to first and second transmission lines via said line switch part, said line switch part connecting each channel with corresponding channel processing parts; and a switching system, connected to said channel processing parts, switching signals when relaying a signal received by a first channel processing part from the first transmission line via said line switch part to the second transmission line via said switching system and a second channel processing part, said second channel processing part transmitting an identification signal to the first channel processing part via said switching system, and said first channel processing part judging whether or not a line is being used as a trunk line based on whether the identification signal is detected, said line switch part forming a trunk connection between said first and second channel processing parts when the identification signal is detected.

2. The trunk line identification system as claimed in claim 1, wherein said second channel processing part generates the identification signal which indicates the second channel.

3. The trunk line identification system as claimed in claim 1, wherein said channel processing parts transmit the identification signal to said switching system in a direction opposite to a connecting direction of a call.

4. The trunk line identification system as claimed in claim 1, wherein said switching system forms a loop back path, which connects the first and second channel processing parts only when the signal received from the transmission line is to be relayed.

5. The trunk line identification system as claimed in claim 1, which further comprises control means, coupled to each of said channel processing parts, for controlling a connection of said line switch part to the second transmission line.

6. The trunk line identification system as claimed in claim 5, wherein said line switch part connects two channels corresponding to the first and second channel processing parts when the first channel processing part detects the identification signal from the second channel processing part.

7. The trunk line identification system as claimed in claim 1, wherein each channel processing part includes compression means for subjecting a signal received from and transmitted to the transmission line via said line switch part to a predetermined signal processing.

8. The trunk line identification system as claimed in claim 7, which further comprises control means, coupled to each of said channel processing parts, for controlling compression means of each of the channel processing parts based on outputs of each of said channel processing parts, said control means bypassing the predetermined signal processing in said first and second channel processing parts when the first channel processing part detects the identification signal from the second channel processing part.

9. The trunk line identification system as claimed in claim 1, wherein said switching system is connected to a subscriber, and said switching system transmits a signal received from the transmission line via the channel processing part to the local subscriber of said first station if a destination of this signal is the local subscriber.

10. A trunk line identification system connected to a transmission line having channels, the trunk line identification system comprising:
- a line switch part connected to each of the channels;
- channel processing parts, coupled to said line switch part, for processing signals received from and transmitted to the transmission line via said line switch part; and
- a switching system, connected to said channel processing parts, switching signals and relaying at least one signal received by a first channel processing part from the transmission line by way of said line switch part to the transmission line by way of said switching system and a second channel processing part, wherein
  - the second channel processing part transmits an identification signal to the first channel processing part by way of said switching system, and
  - said first channel processing part judges whether or not a line is being used as a trunk line based on whether or not the identification signal is detected.

11. A trunk line identification system connected to a transmission line having channels, the trunk line identification system comprising:
- a line switch part connected to each of the channels;
- channel processing parts, coupled to said line switch part, for processing signals received from and transmitted to the transmission line via said line switch part; and
- a switching system, connected to said channel processing parts, switching signals and relaying at least one signal received by a first channel processing part from the transmission line by way of said line switch part to the transmission line by way of said switching system and a second channel processing part, wherein
  - the second channel processing part transmits an identification signal to the first channel processing part by way of said switching system in a direction opposite to a connecting direction of a call, and
  - said first channel processing part judges whether or not a line is being used as a trunk line based on whether or not the identification signal is detected.

12. A trunk line identification system connected to a transmission line having channels, the trunk line identification system comprising:
- a line switch part connected to each of the channels;
- channel processing parts, coupled to said line switch part, for processing signals received from and transmitted to the transmission line via said line switch part; and
- a switching system, connected to said channel processing parts, switching signals and relaying at least one signal received by a first channel processing part from the transmission line by way of said line switch part to the transmission line by way of said switching system and a second channel processing part, wherein
  - the second channel processing part transmits an identification signal to the first channel processing part by way of said switching system, and
  - said first channel processing part judges whether or not a line is being used as a trunk line based on whether or not the identification signal is detected,
  - said switching systems forms a loop back path which connects the first and second channel processing parts only when the signal received from the transmission line is relayed.

13. A trunk line identification system connected to a transmission line having channels, the trunk line identification system comprising:
- a line switch part connected to each of the channels;
- channel processing parts, coupled to said line switch part, for processing signals received from and transmitted to the transmission line via said line switch part; and
- a switching system, connected to said channel processing parts, switching signals and relaying at least one signal received by a first channel processing part from the transmission line by way of said line switch part to the transmission line by way of said switching system and a second channel processing part, wherein
  - The second channel processing part transmits an identification signal to the first channel processing part by way of said switching system, and
  - said first channel processing part judges whether or not a line is being used as a trunk line based on whether or not the identification signal is detected,
  - said line switch part connects to channels corresponding to the first and second channel processing parts when the first channel processing part detects the identification signal from the second channel processing part.

14. A trunk line identification system connected to a transmission line having channels, the trunk line identification system comprising:
- a line switch part connected to each of the channels;
- channel processing parts, coupled to said line switch part, for processing signals received from and transmitted to the transmission line via said line switch part; and
- a switching system, connected to said channel processing parts, switching signals and relaying at least one signal received by a first channel processing part from the transmission line by way of said line switch part to the transmission line by way of said switching system and a second channel processing part, wherein
  - the second channel processing part transmits an identification signal to the first channel processing part by way of said switching system, and
  - said first channel processing part judges whether or not a line is being used as a trunk line based on whether or not the identification signal is detected,
  - each channel processing part includes compression means for subjecting a signal received from and transmitted to the transmission line by way of said line switch part to a predetermined signal processing.

15. The trunk line identification system as claimed in claim 14, which further comprises control means, coupled to each of said channel processing parts, for controlling compression means of each of the channel processing parts based on outputs of said channel processing parts, said control means bypassing the predetermined signal processing in said first and second channel processing parts when the first channel processing part detects the identification signal from the second channel processing parts.

16. The trunk line identification system as claimed in claim 10, wherein said second channel processing part generates the identification signal which indicates the second channel.

* * * * *

UNITED STATES PATENT AND TRADEMARK OFFICE
CERTIFICATE OF CORRECTION

PATENT NO.   :  5,329,526
DATED        :  July 12, 1994
INVENTOR(S)  :  Shigeru MURATA et al.

It is certified that error appears in the above-indentified patent and that said Letters Patent is hereby corrected as shown below:

Column 1, Line 20, change "4 Each" to --4. Each--.

Column 5, Line 28, change "SD" (second occurrence) to --RD--.

Column 5, Line 30, change "a" (second occurrence) to --$\underline{a}$--.

Column 6, Line 6, change "a" to --$\underline{a}$--.

Column 7, Line 21, change "a" to --$\underline{a}$--.

Column 10, Claim 13, Line 24, change "The" to --the--.

Signed and Sealed this

Twenty-seventh Day of September, 1994

Attest:

BRUCE LEHMAN

*Attesting Officer*      *Commissioner of Patents and Trademarks*